(12) United States Patent
Trabert et al.

(10) Patent No.: US 7,660,069 B2
(45) Date of Patent: Feb. 9, 2010

(54) TECHNIQUE FOR SIGNAL AND TRANSDUCER ALIGNMENT IN A TAPE DRIVE

(75) Inventors: Steven G. Trabert, Boulder, CO (US); Mark L. Watson, Louisville, CO (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 12/111,382

(22) Filed: Apr. 29, 2008

(65) Prior Publication Data

US 2009/0268339 A1    Oct. 29, 2009

(51) Int. Cl.
*G11B 5/584* (2006.01)
(52) U.S. Cl. ...................... 360/77.13; 360/31
(58) Field of Classification Search .............. None
See application file for complete search history.

(56) References Cited

U.S. PATENT DOCUMENTS 6,430,008 B1 * 8/2002 Trabert et al. ............... 360/317
6,906,888 B1   6/2005 Trabert et al.
2007/0279782 A1 * 12/2007 Rydhan ...................... 360/31

* cited by examiner

*Primary Examiner*—Jason C Olson
(74) *Attorney, Agent, or Firm*—Brooks Kushman P.C.

(57) ABSTRACT

In an embodiment, a method is provided for improving signal and transducer alignment in a magnetic tape drive. The method includes writing a first track and a second track to a tape. Each track has an associated track characteristic, which may include fundamental frequency and test binary pattern, among other characteristics. The tracks are adjacent and substantially parallel to one another, and each track has a differing track characteristic value. Each track is read at multiple tracking positions to collect values corresponding to each position. An optimal offset is determined based on the collected values and the corresponding tracking positions. In another embodiment, a magnetic tape drive includes a data reader, a data writer, a processor, and a computer readable medium. The medium has stored instructions, executable by the processor, for carrying out the described method.

17 Claims, 10 Drawing Sheets

TECHNIQUE FOR SIGNAL AND TRANSDUCER ALIGNMENT IN A TAPE DRIVE

BACKGROUND

1. Field

Embodiments of the present invention relate to tape drives and more specifically to signal-and-transducer alignment in a tape drive.

2. Background Art

Tape drives read and write data on magnetic tapes. They commonly write data to and read data from multiple data tracks which run parallel to one another over the length of the tape. A given drive has a tape head which includes one or more data readers and data writers for respectively reading and writing the tracks.

With increasing track density, properly aligning the tape and the tape head becomes increasingly important. For example, as the tape moves past the tape head, lateral drift of the tape can result in the tape drive reading or writing a wrong data track—or doing so at an imprecise location. To mitigate errors resulting from lateral drift, many tape drives have servo readers on the tape head that maintain alignment with pre-written servo tracks on the tape during read and write operations.

However, as track density further increases, variances in the manufacture of the tape head can cause tracks to be read from, or written to, the wrong location. For example, in the fabrication of certain tape heads, servo readers and data readers may be defined in one layer of the tape head, whereas data writers may be defined in another layer. A non-ideal fabrication of the tape head may cause a layer-to-layer offset, resulting in an incorrect distance between the servo readers and the data writers. This can result in imprecise reading and writing operations.

SUMMARY

Several embodiments of the present invention take the form of a method for signal and transducer alignment in a tape drive. The method includes writing a first track and a second track to a magnetic tape. Each track has an associated track characteristic, which may include fundamental frequency and test binary pattern, among other characteristics. The tracks are adjacent and substantially parallel to one another, and each track has a differing track characteristic value. Each track is read at multiple tracking positions to collect values corresponding to each position. An optimal offset is determined based on the collected values and the corresponding tracking positions.

Some embodiments of the present invention take the form of a magnetic tape drive, which includes a data reader, a data writer, a processor, and a computer readable medium. The medium may have stored instructions, executable by the processor, for carrying out the method noted above.

BRIEF DESCRIPTION OF THE DRAWINGS

Embodiments of the present invention described herein are recited with particularity in the appended claims. However, other features will become more apparent, and the embodiments may be best understood by referring to the following detailed description in conjunction with the accompanying drawings, in which:

DETAILED DESCRIPTION OF THE EMBODIMENTS

This invention is not limited to the specific embodiments described below. The disclosed embodiments are merely exemplary of the invention, which may be embodied in various and alternative forms. Therefore, specific details disclosed in this section are not to be interpreted as limiting, but merely as a representative basis for any aspect of the invention and for teaching a skilled artisan to employ the present invention.

Except in the examples, or where otherwise expressly indicated, all numerical quantities in this section are to be understood as modified by the word "about" in describing the broadest scope of the invention. Also, as used in the specification and the appended claims, the singular forms "a", "an" and "the" comprise plural referents unless the context clearly indicates otherwise. Unless otherwise indicated, the Figures are not necessarily to scale.

Figure 1A:
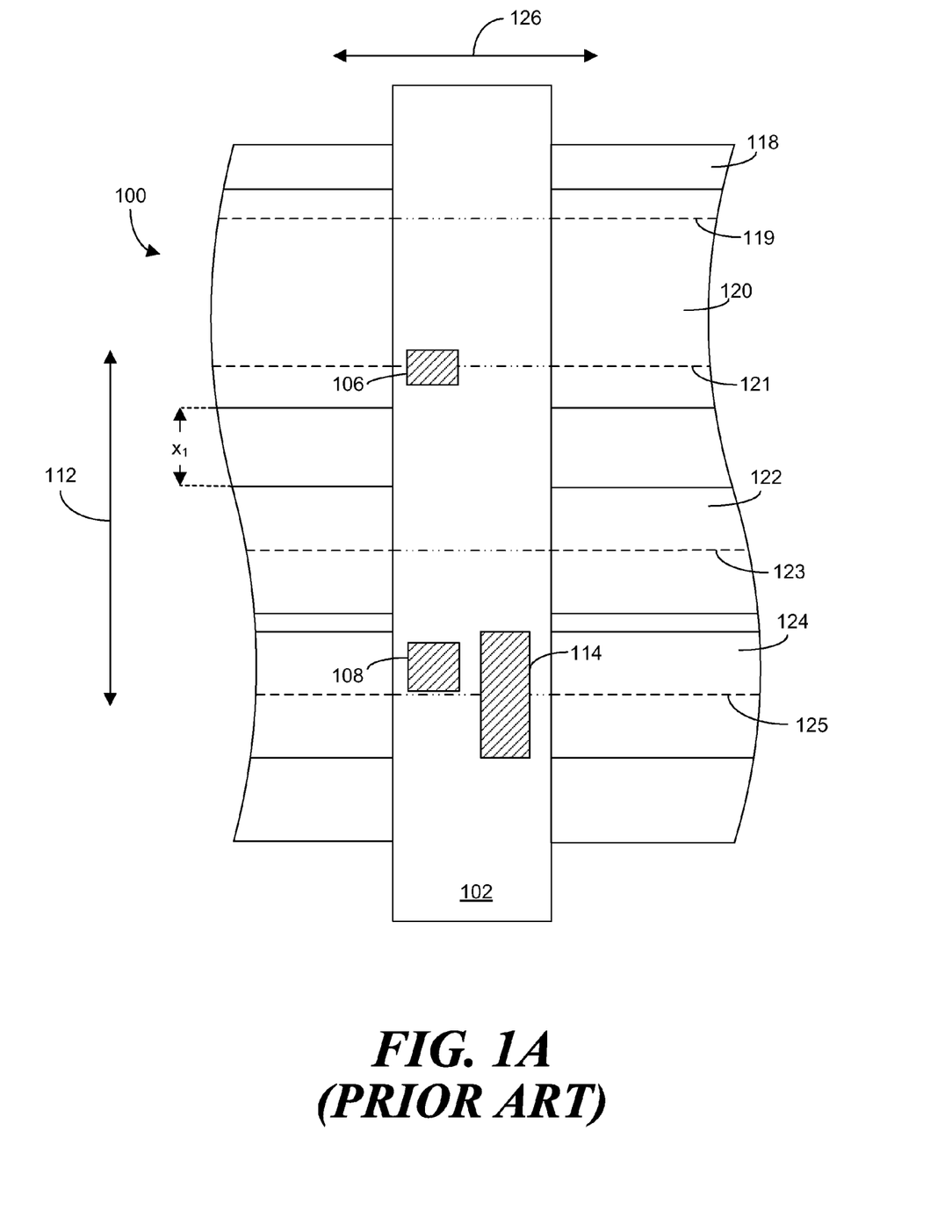
FIG. 1A shows a schematic diagram illustrating a tape head of a first tape drive during a read or write operation according to the prior art.

FIG. 1A shows a simplified schematic diagram illustrating a first tape head 100 in accordance with the prior art. The tape head 100 is part of a first tape drive, which is not shown. The functional components of the tape head 100 are found on a bump 102. A servo reader 106, a data reader 108, and a data writer 114 are coupled to the bump 102; the data writer 114 is located generally adjacent to the data reader 108. Notably, the servo reader 106 and the data reader 108 are defined in a first layer of the tape head 100; the data writer 114 is defined in a second layer.

The bump 102 is positioned relative to a magnetic tape 118. As shown, the tape 118 has a pre-written servo track 120, along with two data tracks 122, 124 written by the first tape drive; each track is generally parallel to the others. For illustrative simplicity, only these tracks are shown; the tape 118 may of course have other servo tracks and data tracks written to it. Notably, the tape drive may control the speed at which the tape 118 moves past the head 100 (along 126) and the lateral offset of the tape 118 (along 112).

The servo reader 106 may align with the servo track 120 along two positions, 119 or 121. The position of the servo reader 106 corresponds to the region of the tape 118 that is either written to, if the tape drive is in a write operation, or read from, if it is in a read operation. For example, if the servo reader 106 is aligned with position 119, data will either be written to or read from the region corresponding to track 122. When the servo reader 106 is aligned with position 121, as illustrated, the tape drive will either read to, or write data from, the region corresponding to track 124.

As noted, the servo reader 106 and the data reader 108 are defined in a first tape-head layer; the data writer 114 is defined in a second layer. Due to manufacturing variations, the first layer and the second layer are offset relative to one another. As shown, the data writer 114 is offset low, so the first track 122 is written at a non-nominal distance $x_1$ from the servo track 120. This offset carries over to each track, so the data writer 114 also writes the second track 124 low relative to the nominal position. As a result, the data reader 108 is offset high relative to the center 125 of the second data track 124. This offset causes the data reader 108 to read the second data track 124 imprecisely during a subsequent read operation, possibly result in a higher incidence of read errors, especially at higher track densities.

Figure 1B:
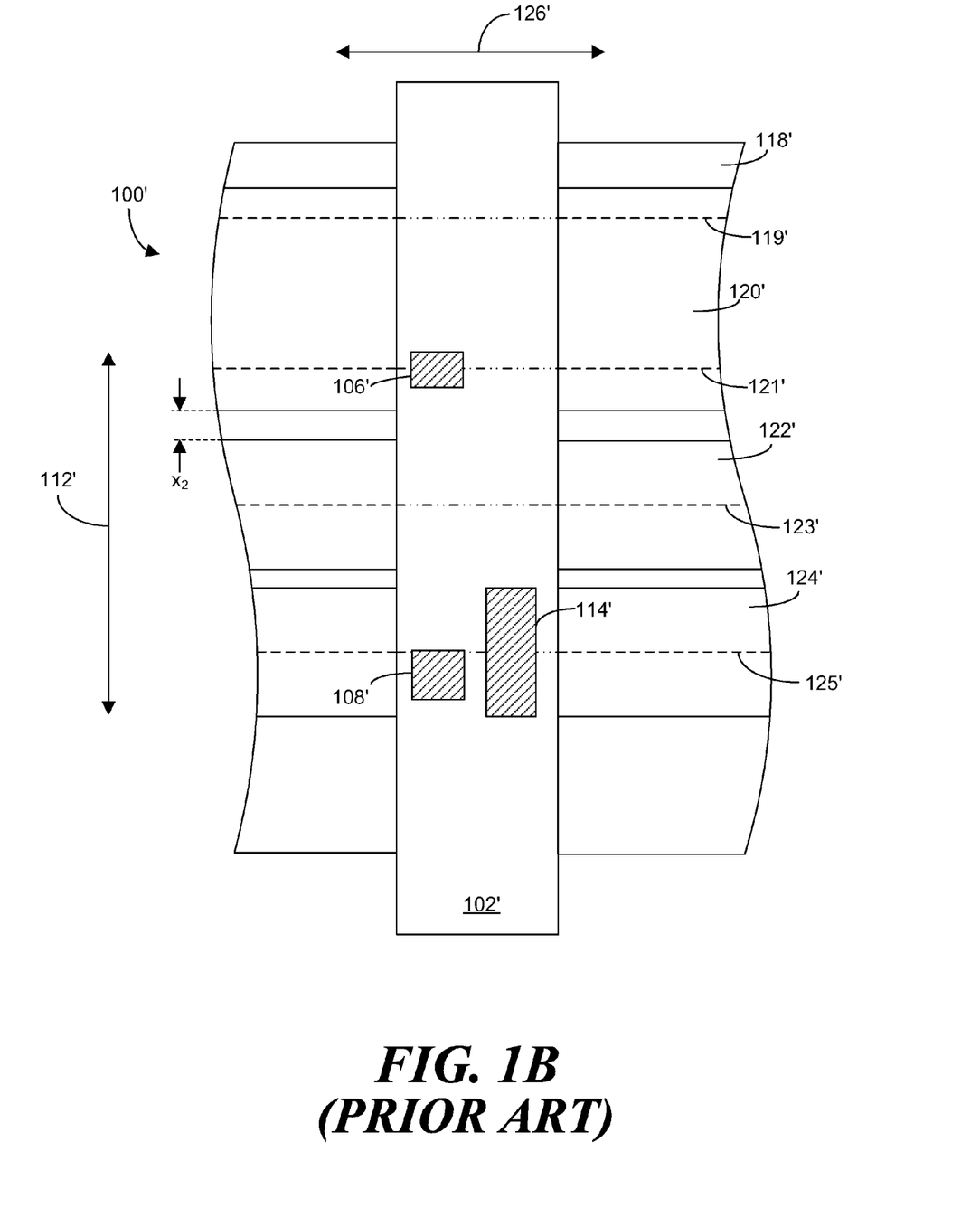
FIG. 1B shows a schematic diagram illustrating a tape head of a second tape drive during a read or write operation according to the prior art.

FIG. 1B shows a simplified schematic diagram illustrating a second tape head 100' in accordance with the prior art. The tape head 100' is part of a second tape drive, which is not shown. The second tape head 100' is structurally similar to the tape drive 100 previously shown and described. The tape head 100' is positioned relative to a magnetic tape 118'. The tape 118' has a previously written servo track 120', along with two data tracks 122',124' written by the second tape drive. Due to a layer-to-layer offset in the tape head 100', the data tracks 122', 124' are offset relative to the nominal position; the first track 122' is written at a distance $x_2$ from the servo reader 120'. Notably, this distance is different from the write distance $x_1$ in the first tape head 100. Due to this offset, the data reader 108' is offset relative to the center 125' of the second data track 124'. This may result in more read errors, especially at higher track densities.

Figure 1C:
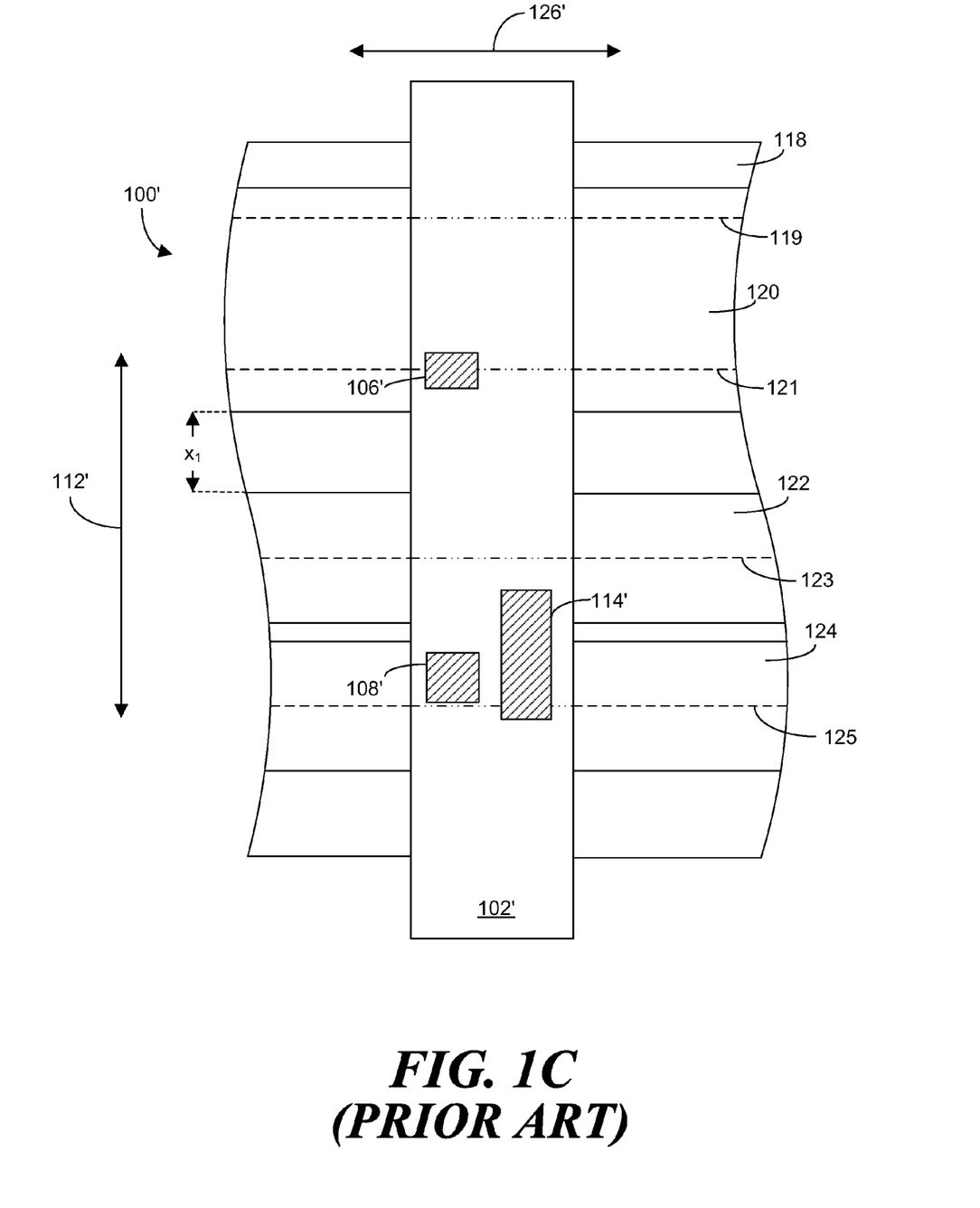
FIG. 1C shows a schematic diagram illustrating the tape head of the second tape drive reading a tape written by the first tape drive according to the prior art.

FIG. 1C shows a schematic diagram illustrating the second tape head 100' reading the tape 118 previously written by the first tape head 100 according to the prior art. As mentioned, the first-head writer 114 and the second-head writer 114' are each non-nominally offset from the respective servo reader due to tape-drive manufacturing variation. However, the offsets are different in each tape drive (e.g., $x_1$ for head 100 and $x_2$ for head 100'), due to different layer-to-layer offsets in each tape head. As a result, both the data reader 108' and the data writer 110' are offset relative to the center 125 of the second data track 124. Moreover, the data writer 114' is partially aligned with the first data track 122. As a result, during a write operation, the data writer 114' may undesirably overwrite part of the first data track 122. In this manner, when multiple tape drives have non-ideal tape-head variances, data loss can occur when a tape is swapped from one drive to the other.

Figure 2:
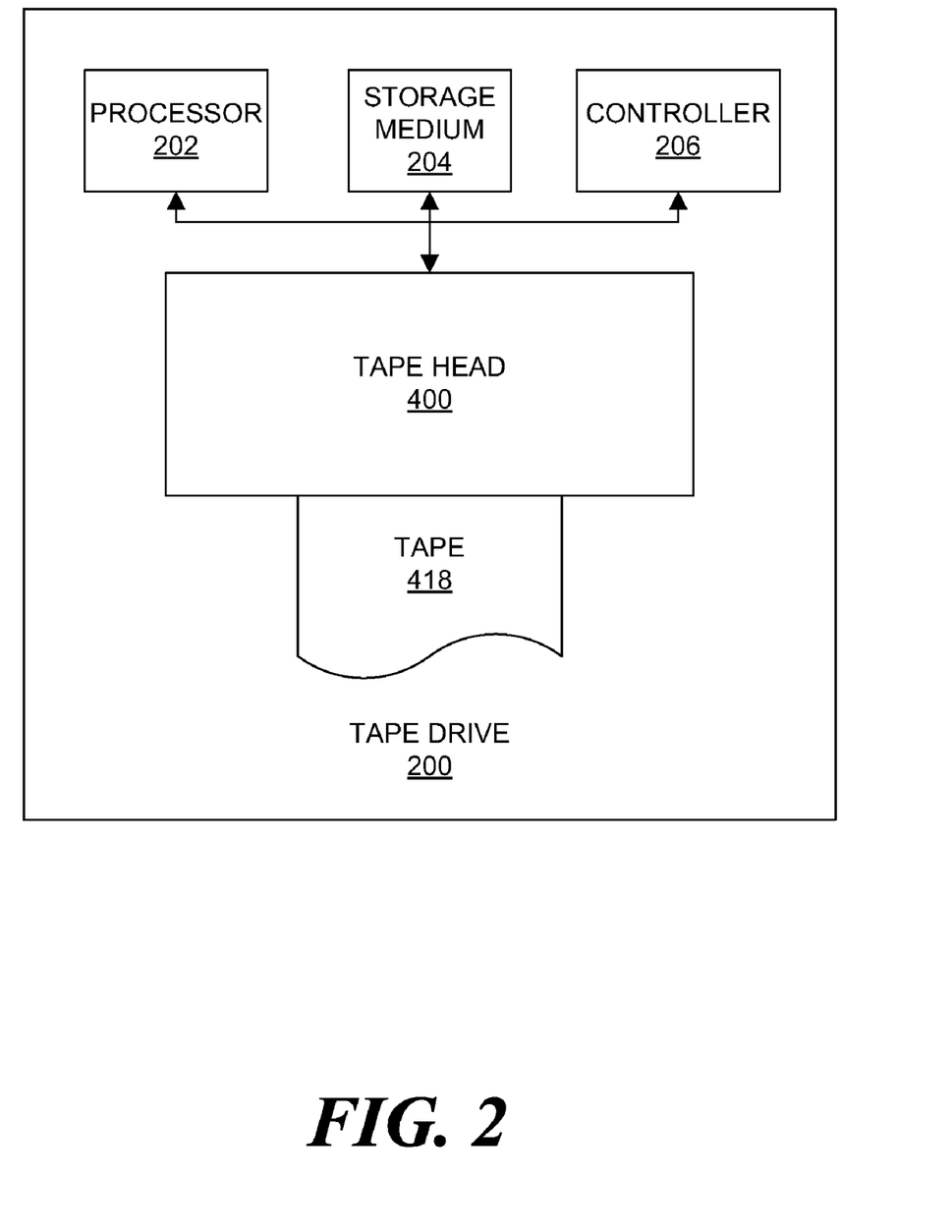
FIG. 2 shows a tape drive according to an embodiment of the present invention.

FIG. 2 shows a tape drive 200 according to an embodiment of the present invention. The tape drive 200 houses a processor 202, a storage medium 204, a controller 206, and a tape head 400; each are electrically coupled to one another. The tape drive 400 is configured to receive magnetic tape 418, which may, for example, be rolled on a spindle (not shown) mounted within the housing of the tape drive 200. The processor 202 (e.g., a microprocessor) is configured to receive instructions from the storage medium 204 and provide instructions to the controller 206 (e.g., one or more motors). The controller 206 is configured to functionally operate the speed and offset of the received tape 418, along with components in the tape head 400, based on instructions received from the processor 202.

Figure 3:
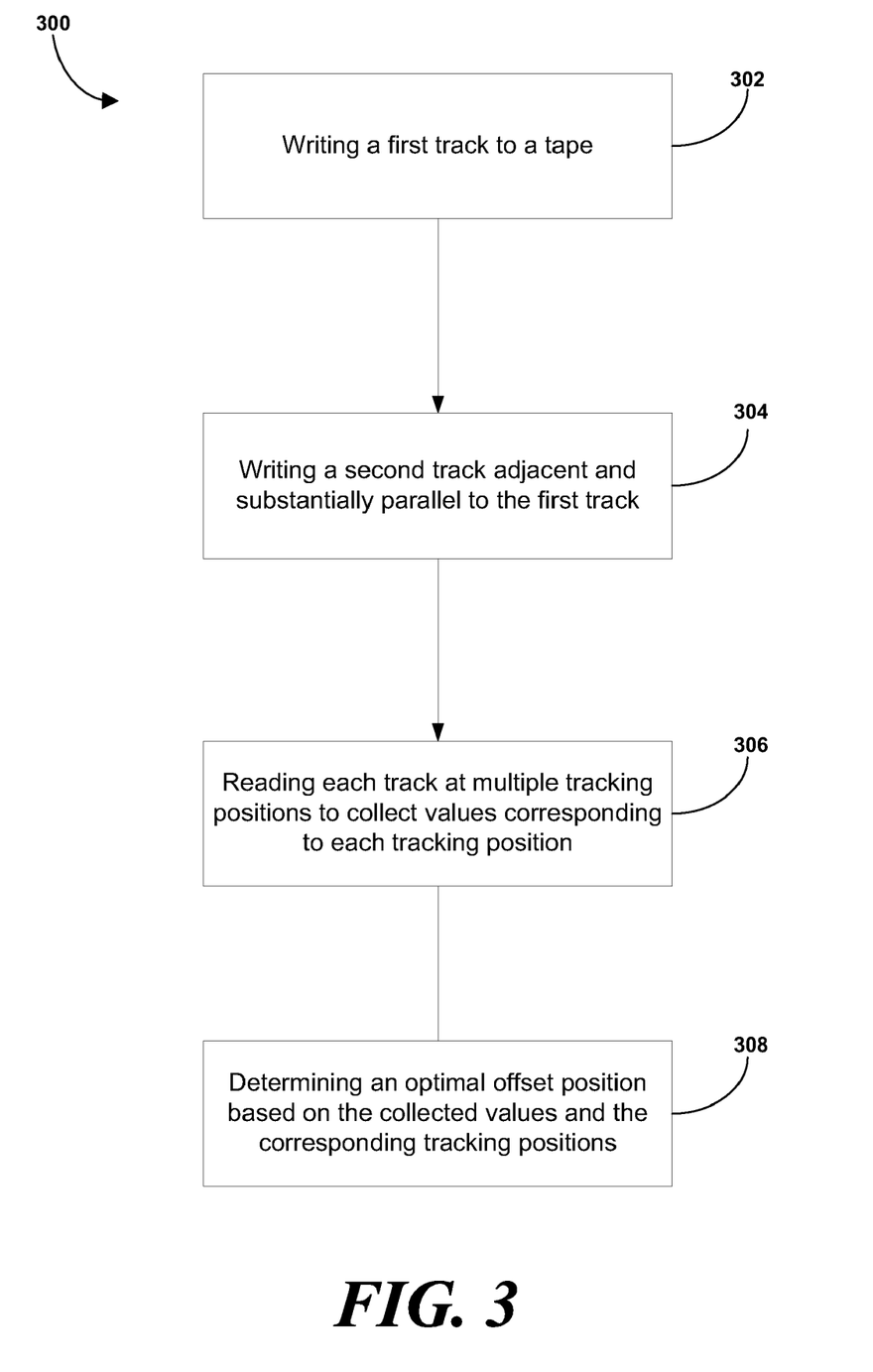
FIG. 3 shows a flow diagram illustrating a method for improving signal-and-transducer alignment in a tape drive according to an embodiment of the present invention.

Several embodiments of the present invention takes the form of a method to compensating for some of the errors that cause tracks to be misplaced during write operations. FIG. 3 shows a flowchart 300 illustrating one such method. Typically, servo tracks are placed on magnetic tapes during the manufacture process. In at least one embodiment, these pre-written tracks are used to calibrate a given tape drive in order to compensate for tape-drive non-idealities (e.g., a layer-to-layer offset). The following disclosure refers primarily to manufacturing non-idealities in the form of tape-head layer-to-layer offsets. However, embodiments of the present invention may also be applicable to mitigating the effects of other manufacturing non-idealities, for example, a non-nominal data writer width. To explain each step of the flowchart 300, reference is made to the tape drive 200 shown in FIG. 2 and to the tape head 400 shown in FIGS. 4, 5, and 7.

Figure 4:
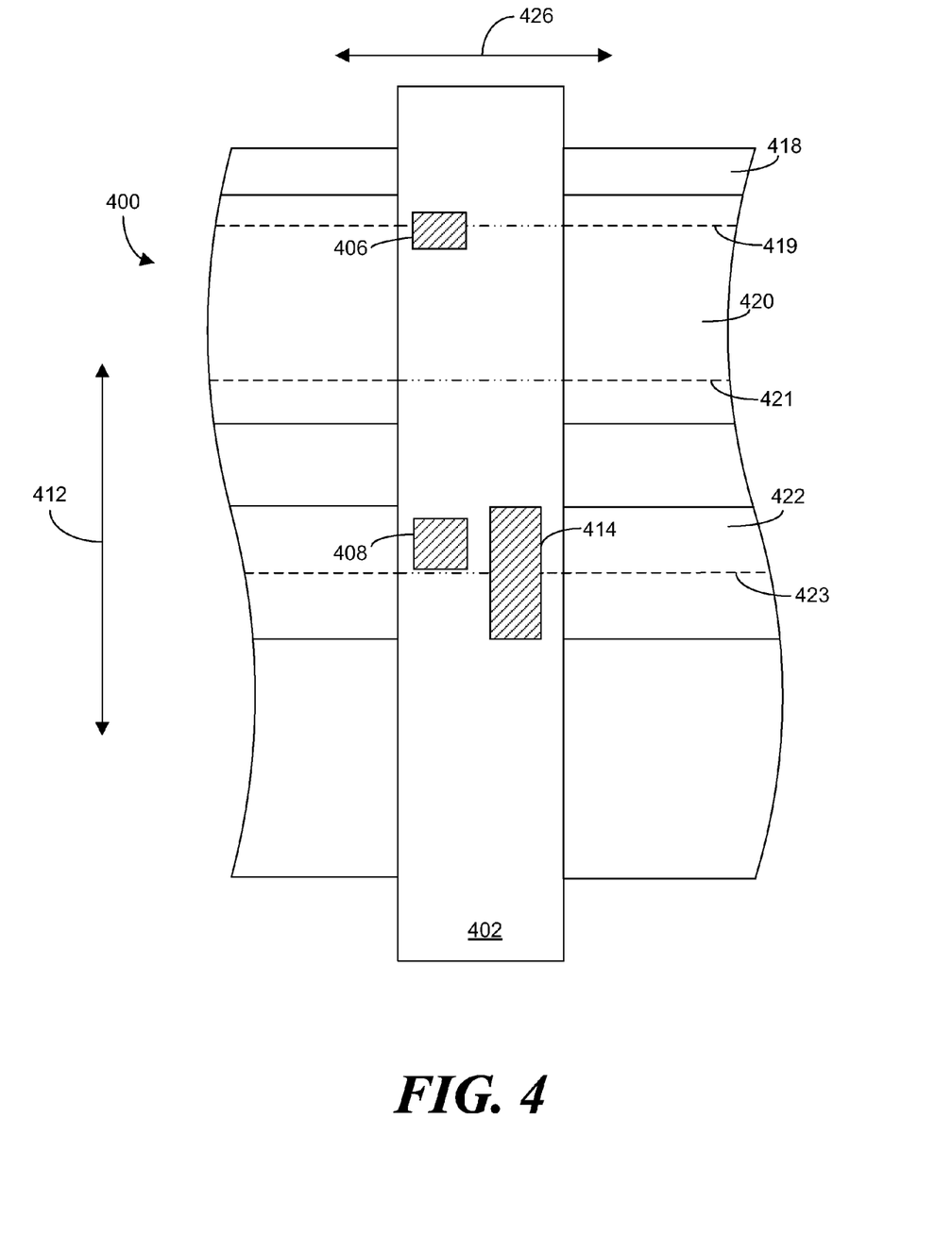
FIG. 4 shows a schematic diagram illustrating a tape head after writing a first test track to a magnetic tape according to an embodiment of the present invention.

In step 302, the tape drive 200 writes a first test track 422 to a tape 418. FIG. 4 shows a schematic view of the tape head 400 upon writing the first test track 422. The tape head 400 attempts to write the test track 422 at a nominal location from the servo track 420 (e.g., 20 um) with a nominal track width (e.g., 11 um); however, a layer-to-layer offset in the tape head 400 may cause the actual write location of the track 422 to vary from this nominal location. Note the imprecise location of the data reader 408 relative to the center 423 of the first test track 422. The first track 422 is written without an attempt at correcting the layer-to-layer offset.

Figure 5:
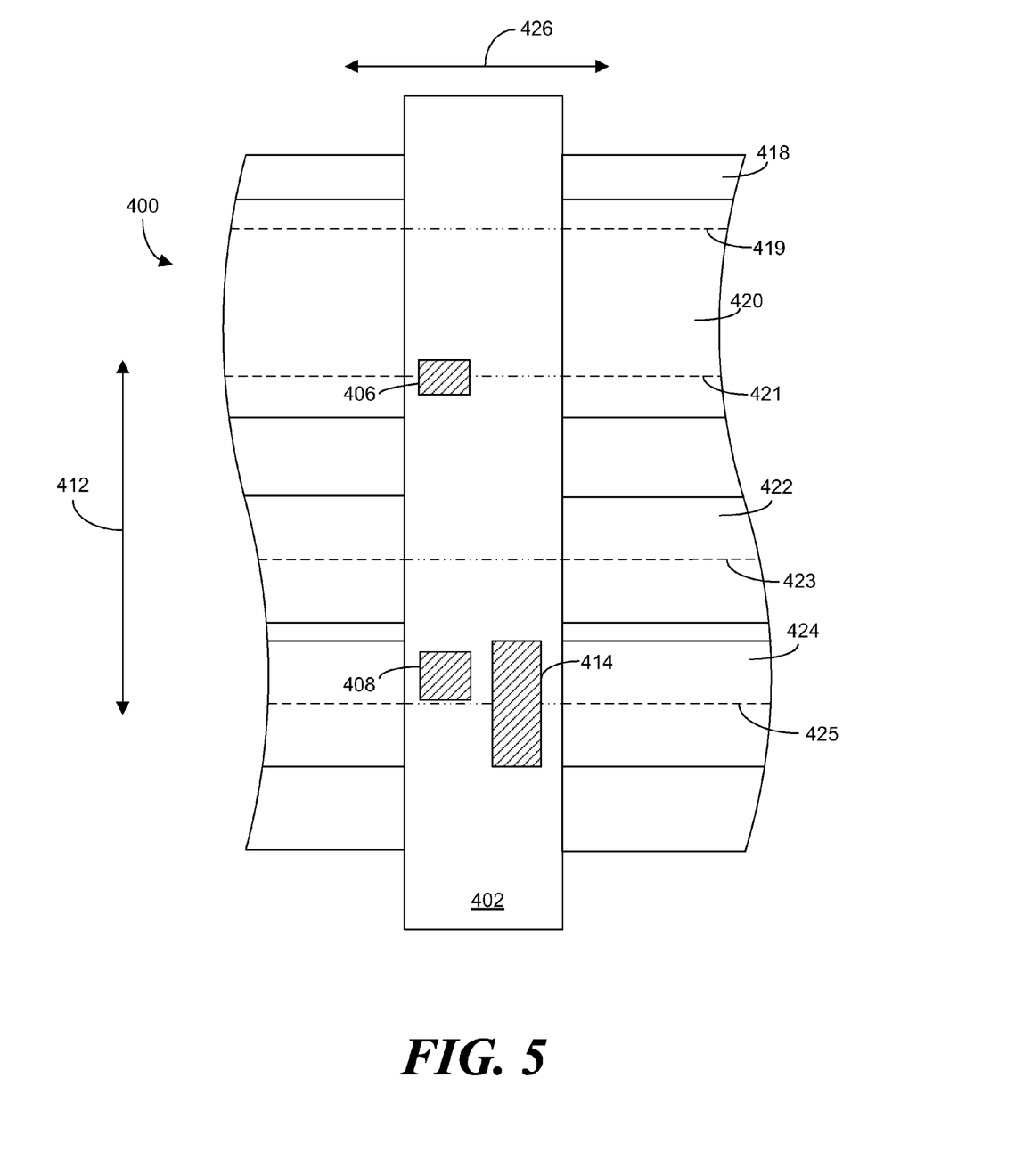
FIG. 5 shows a schematic diagram illustrating the tape head in FIG. 4 after writing a second test track to the tape.

In step 304, the tape head 400 writes a second test track 424 to the tape 418. FIG. 5 shows a schematic view of the tape head 400 after it writes the second test track 424. As shown, the second track 424 is written adjacent and substantially parallel to the first track 422. As with the first track 422, the tape head 400 attempts to write the second track 424 at a nominal location from the servo track 420 (e.g., 40 um); again, the layer-to-layer offset in the tape head 400 may cause the actual write location to vary from this nominal location. The second track 424, like the first track 422, is written without an attempt at correcting the tape-head layer-to-layer offset. Notably, the data reader 408 is offset relative to the center 425 of the second test track 424.

Each test track 422,424 has a number of track characteristics, such as a fundamental frequency and a binary pattern. For example, the first track 422 may have a fundamental frequency of 10.6 MHz and a binary pattern of "1010," and the second track 424 may have a fundamental frequency of 7.075 MHz and a binary pattern of "100100." Although in this example the tracks 422,424 have differing fundamental frequencies and binary patterns from one another, each track may instead differ by a single track characteristic, for example, fundamental frequency alone. Notably, any suitable coding system (i.e., binary, trinary, etc.) may be used to encode the test tracks 422,424.

In step 306, each written test track 422,424 is read at multiple offsets from the respective nominal read location. More specifically, the controller 206 offsets the tape 418, such that the servo track 420 is offset from the servo reader 406 by a specified distance (e.g., one micron). In the region of each track 422,424, the magnitude of the track's distinguishing characteristic(s) is assessed by reading at this offset; for example, the amplitude of the given track's fundamental frequency may be read at a one micron offset. This process is then repeated at other offset distances (i.e., 2 um, 3 um, etc.). From these iterations, two sets of amplitude values result—a first set, corresponding to the data values collected measuring the value of the distinguishing characteristic of the first test track 422, and a second set, corresponding to the values collected measuring the value of the distinguishing characteristic of the second test track 424.

Figure 6:
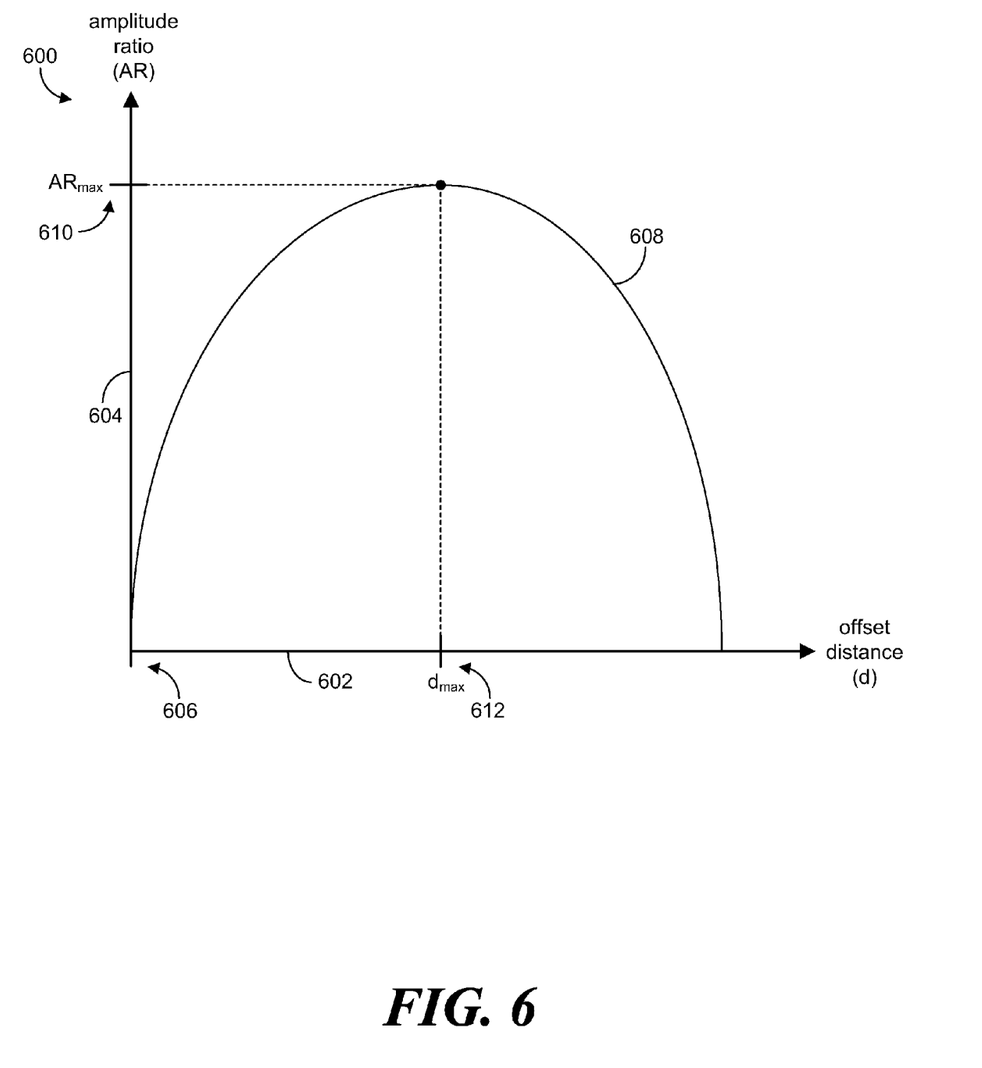
FIG. 6 shows a graph illustrating a technique for determining an optimal offset according to an embodiment of the present invention.

In step 308, an optimal offset is determined from the two amplitude-value sets. FIG. 6 shows a graph 600 illustrating a technique for determining the optimal offset according to an embodiment of the present invention. The horizontal axis 602 of the graph 600 corresponds to offset distance (d). A 0-um offset distance 606 represents the nominal track position; each distance greater than 0-um represents a different offset between the servo track 420 and the servo reader 406. The vertical axis 604 of the graph 600 represents amplitude ratio (AR). The amplitude ratio is a function of offset distance. In an embodiment, each amplitude-ratio value is the ratio of the first-amplitude-set value to the second-amplitude-set value for the given offset distance. This ratio can be mathematically expressed as follows:

$$AR(d) = A_{1,d}/A_{2,d}; \text{ where:}$$

AR(d) is the amplitude ratio as a function of an offset distance, d;

$A_{1,d}$ is the amplitude value in the first-amplitude set for the given offset distance, d; and $A_{2,d}$ is the amplitude value in the second-amplitude set for the given offset distance, d.

The amplitude ratios and the corresponding offset distances define a curve 608, which has a maximum amplitude value ($AR_{max}$) 610 at a corresponding offset distance ($d_{max}$) 612. This distance 612 is selected as the optimal offset distance. In at least one embodiment, the optimal offset distance is stored to the storage medium 204 for later use by the tape drive 200.

Figure 7:
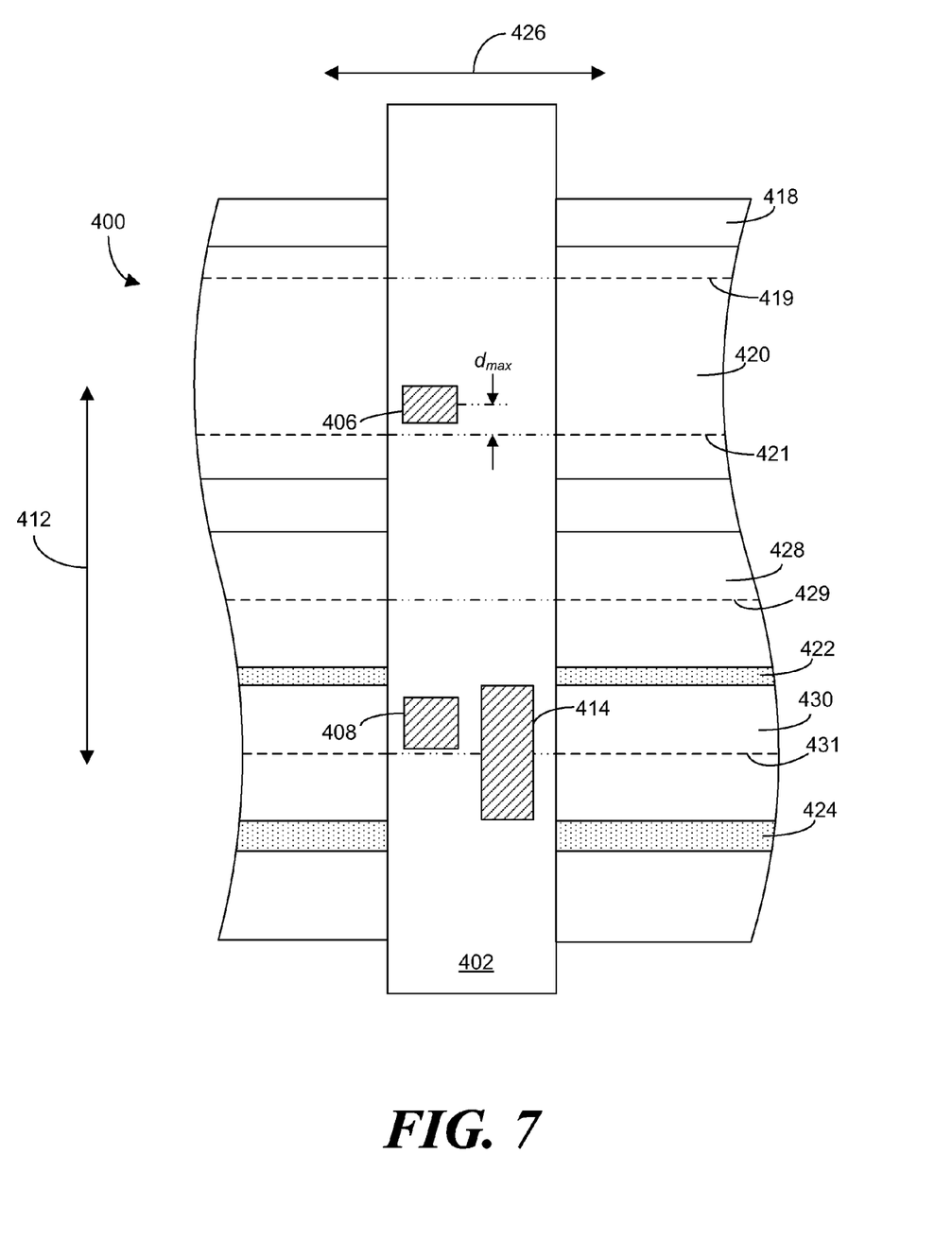
FIG. 7 shows a schematic diagram illustrating the tape head in FIG. 5 after a write operation, in which the tape head uses the optimal offset.

The tape drive may use the determined, stored optimal offset distance during either subsequent write operations or read operations. FIG. 7 shows a schematic view of the tape head 400 using the optimal offset during a write operation according to an embodiment of the present invention. During write operations, the servo reader 406 does not track either position 419, 421 of the servo track 420. Instead, the tape-drive controller 208 laterally shifts the tape 418, offsetting the respective position 421 of the servo track 420 from the servo reader 406 by the optimal offset distance ($d_{max}$). As a result, the data track 430, written during the previous write operation, is also offset relative to the previously-written test track 424 by the optimal offset distance.

Figure 8:
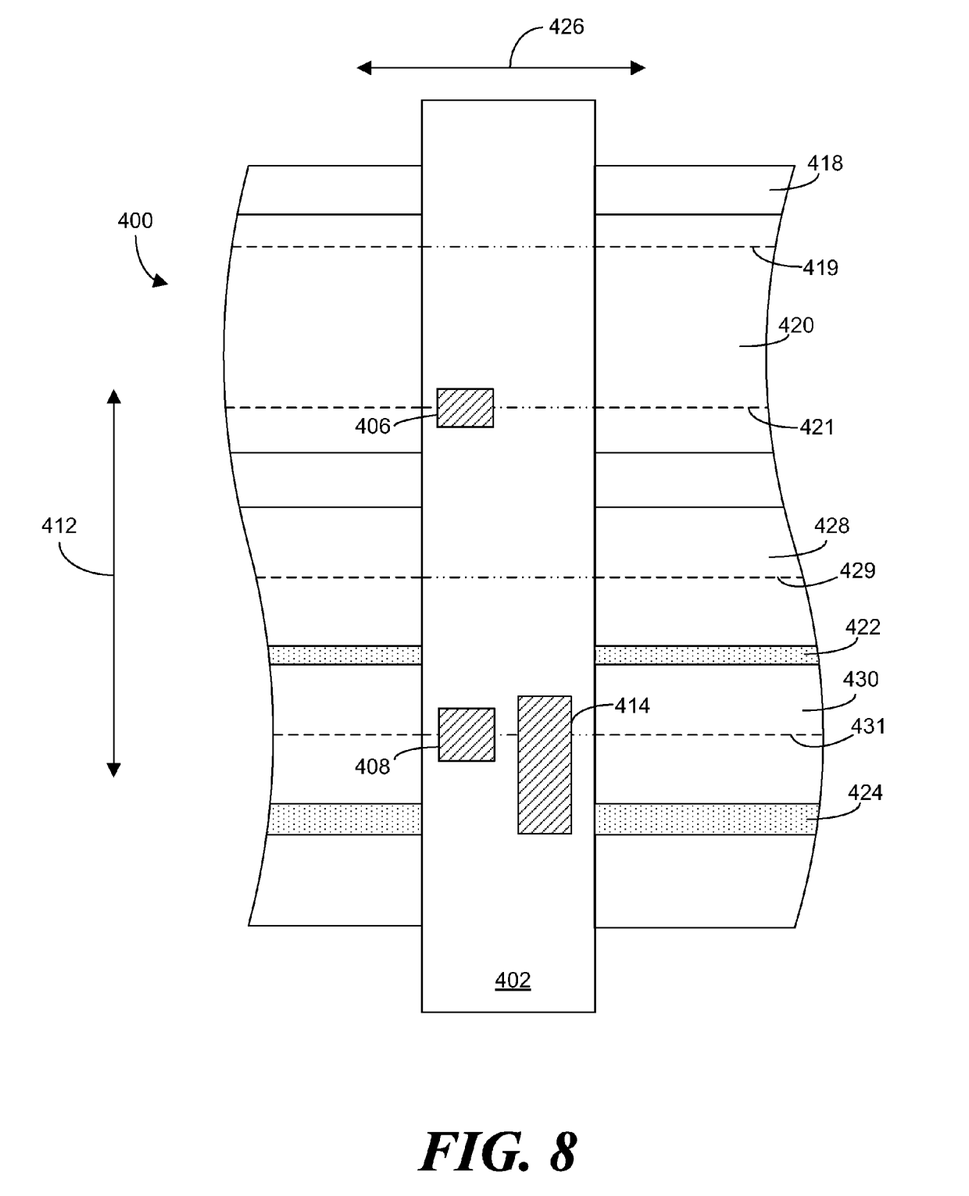
FIG. 8 shows a schematic diagram illustrating the tape head in FIG. 7 after a read operation, in which the tape head does not use the optimal offset.

FIG. 8 shows a schematic view of the tape head 400 during a read operation. Here, the tape drive 200 does not use the optimal offset distance during read operations. Accordingly, the servo reader 406 aligns with the respective position 421 of the servo track 420. Due to correct placement of the data track 430, the data reader 408 properly aligns with the center 431 of the written data track 430. In this way, the tape drive 200 can use the optimal offset distance to compensate for a layer-to-layer offset, among other manufacturing non-idealities, in the tape head 400.

One or more of the steps shown in FIG. 3 may be performed during manufacturing of the tape drive 200, effectively allowing for a one-time calibration of the tape drive 200. Notably, the optimal offset distance may be stored to the storage medium 204 for subsequent retrieval by the tape drive 200. Moreover, the tape drive 200 may have instructions stored to the storage medium 204 for performing the steps shown in FIG. 3 after the tape drive has been manufactured. Such instructions may be useful for performing periodic diagnostic checks to ensure a proper signal-to-transducer alignment.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method for improving signal and transducer alignment in a magnetic tape drive, the method comprising:

writing a first track and a second track to a tape, each track having a track characteristic, wherein the tracks are adjacent and substantially parallel to one another and each track has a differing track characteristic value;

reading each track at multiple tracking positions to collect values corresponding to each tracking position; and determining an optimal offset position based on the collected values and the corresponding tracking positions for the first and second tracks, the optimal offset position being determined so as to make both the first track and the second track readable.

2. The method of claim 1 comprising offsetting the tape during a subsequent write or read operation according to the optimal offset position.

3. The method of claim 1 wherein the track characteristic is selected from the group consisting of fundamental frequency and binary pattern.

4. The method of claim 3 wherein each track is characterized by a binary pattern.

5. The method of claim 3 wherein two tracks having differing fundamental frequency track characteristics differ by at least 1 MHz.

6. The method of claim 1 wherein a servo track is written to the tape, a servo reader is aligned with the servo track, and the step of writing is performed by writing each track to one of a plurality of offset locations from the servo track.

7. The method of claim 1 wherein reading each track comprises:

determining the amplitude of the first track at each tracking position, thereby defining a first set of amplitude values; and determining the amplitude of the second track at each tracking position, thereby defining a second set of amplitude values.

8. The method of claim 7 comprising comparing first set amplitude values to second set amplitude values for corresponding tracking positions, and selecting as the optimal offset position the tracking position that satisfies a prescribed relationship between the amplitude value sets.

9. The method of claim 8 wherein, for a given tracking position, the prescribed relationship between the amplitude value sets is satisfied by maximizing or minimizing the ratio between the corresponding first track amplitude value and the corresponding second track amplitude value relative to other pairs of first and second track amplitude values.

10. The method of claim 1 wherein the steps of writing, reading, and determining are performed during manufacture of the tape drive.

11. The method of claim 1 wherein the steps of writing, reading, and determining are performed during tape drive operations.

12. A magnetic tape drive comprising:

a data reader;

a data writer;

a processor; and a computer readable medium including stored processor-executable instructions for:

writing a first track and a second track to a tape, each track having a track characteristic, wherein the tracks are adjacent and substantially parallel to one another and each track has a differing track characteristic value;

reading each track at multiple tracking positions to collect values corresponding to each tracking position;

determining an optimal offset position based on the collected values and the corresponding tracking positions for the first and second tracks, the optimal offset position being determined so as to make both the first track and the second track readable; and storing the optimal offset position to the medium.

13. The tape drive of claim 12 wherein the medium includes a stored processor-executable instruction for offsetting the tape during a subsequent write or read operation according to the optimal offset position.

14. The tape drive of claim 13 wherein the instructions for writing, reading, determining, storing, and offsetting are performed during tape drive operations.

15. The tape drive of claim 12 wherein the track characteristic is selected from the group consisting of fundamental frequency and test binary pattern.

16. The tape drive of claim 12 wherein the instruction for reading comprises instructions for:

determining the amplitude of the first track at each tracking position, thereby defining a first set of amplitude values; and determining the amplitude of the second track at each tracking position, thereby defining a second set of amplitude values.

17. The tape drive of claim 16 wherein the medium includes a stored processor-executable instruction for comparing the first amplitude value set to the second amplitude value set for corresponding tracking positions and selecting as the optimal offset position the tracking position that satisfies a prescribed relationship between the amplitude value sets.

* * * * *